(12) United States Patent
Wachsman et al.

(10) Patent No.: US 8,613,848 B2
(45) Date of Patent: Dec. 24, 2013

(54) CONCURRENT $O_2$ GENERATION AND $CO_2$ CONTROL FOR ADVANCED LIFE SUPPORT

(75) Inventors: Eric D. Wachsman, Gainesville, FL (US); Keith L. Duncan, Gainesville, FL (US); Helena Hagelin-Weaver, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1057 days.

(21) Appl. No.: 12/598,243

(22) PCT Filed: Apr. 30, 2008

(86) PCT No.: PCT/US2008/062047
§ 371 (c)(1),
(2), (4) Date: Oct. 30, 2009

(87) PCT Pub. No.: WO2008/147623
PCT Pub. Date: Dec. 4, 2008

(65) Prior Publication Data
US 2010/0147699 A1    Jun. 17, 2010

Related U.S. Application Data

(60) Provisional application No. 60/926,909, filed on Apr. 30, 2007.

(51) Int. Cl.
*C01B 13/02* (2006.01)
*B01D 61/46* (2006.01)
*C25B 11/04* (2006.01)

(52) U.S. Cl.
USPC ........ 205/634; 204/266; 204/278; 204/290.1; 204/291; 204/294; 205/635; 422/122; 422/169; 422/177; 423/230

(58) Field of Classification Search
USPC ........................................................ 205/634
See application file for complete search history.

(56) References Cited

U.S. PATENT DOCUMENTS

| | | | | |
|---|---|---|---|---|
| 5,338,412 A | * | 8/1994 | Burk et al. | 205/635 |
| 5,456,807 A | | 10/1995 | Wachsman | |
| 5,985,113 A | * | 11/1999 | Crome et al. | 205/343 |
| 6,106,966 A | * | 8/2000 | Crow | 429/442 |
| 6,264,807 B1 | | 7/2001 | Fenner et al. | |

(Continued)

*Primary Examiner* — Patrick Ryan
*Assistant Examiner* — William Leader
(74) *Attorney, Agent, or Firm* — Saliwanchik, Lloyd & Eisenschenk (57) ABSTRACT

A device for the concurrent oxygen generation and control of carbon dioxide for life support system involves two stages, where a first stage removes $CO_2$ from an exhalent side of a ventilation loop and a second stage employs Ceramic Oxygen Generators (COGs) to convert $CO_2$ into carbon and $O_2$. The first stage includes a plurality of chambers and means to switch the ventilation loop through at least one of the chambers, where $CO_2$ removal is carried out before discharge of the $CO_2$ depleted gas to an inhalant side of the ventilation loop, and to exclude the ventilation loop from the remaining chambers of the first stage, where these chambers are placed in communication with the second stage. The second stage has two portions separated by the COGs such that $CO_2$ and the formed carbon remain on an intake portion from the $O_2$ rich atmosphere on the exhaust side, which is plumbed via a metering valve to introduce the $O_2$ rich atmosphere to the inhalant side of the ventilation loop.

52 Claims, 4 Drawing Sheets

(56) References Cited

U.S. PATENT DOCUMENTS

| | | |
|---|---|---|
| 6,613,384 B1 | 9/2003 | Waller |
| 7,396,442 B2 * | 7/2008 | Bagby et al. .................. 204/288 |
| 7,550,748 B2 * | 6/2009 | Caliendo et al. ......... 250/492.21 |
| 2004/0183055 A1 | 9/2004 | Chartier et al. |
| 2008/0264254 A1 * | 10/2008 | Song et al. ....................... 95/116 |
| 2009/0220388 A1 * | 9/2009 | Monzyk et al. ............... 422/121 |

* cited by examiner

CONCURRENT O₂ GENERATION AND CO₂ CONTROL FOR ADVANCED LIFE SUPPORT

CROSS-REFERENCE TO RELATED APPLICATION

This application is the U.S. national stage application of International Patent Application No. PCT/US2008/062047, filed Apr. 30, 2008, which claims the benefit of U.S. Provisional Patent Application No. 60/926,909, filed Apr. 30, 2007, the disclosures of which are hereby incorporated by reference in their entireties, including all figures, tables and drawings.

GOVERNMENT SUPPORT

The subject matter of this application has been supported by a research grant from the National Aeronautic and Space Administration under Grant No. NNJO6HB01C. Accordingly, the government has certain rights in this invention.

FIELD OF THE INVENTION

The invention relates to a device to generate oxygen concurrently with the reduction of $CO_2$ for life support systems.

BACKGROUND OF THE INVENTION

Weight is one of the most crucial factors in determining the viability of manned space travel, such as a mission to mars. Ostensibly, much of the technology needed for manned space travel is already in place but its weight is prohibitive. Particularly, life support related technologies are currently too heavy for an astronaut to carry for a reasonable duration without exhaustion. The deficit caused by weight for a life support system is also a deficit for other endeavors where a relatively long use of the system, including the use in a mining or other environment during emergency or other situations where the atmosphere is not conducive to breathing.

There are two crucial parts of such a life support system, those being carbon dioxide ($CO_2$) removal and oxygen ($O_2$) supply. Current $CO_2$ removal technologies are not suitable for use on a long space mission, such as a mars mission, because of their weight and may not be appropriate for interaction with the Martian environment. State of the art advanced $CO_2$ removal systems employ lithium hydroxide canisters for $CO_2$ removal. Such a system requires approximately sixty pounds of consumable lithium hydroxide for a proposed five day Mars surface mission. To decrease such weight penalties on a mission to mars, it is imperative to employ an alternative system. Cycling bed and permeable membranes systems are also unsuitable because the high $CO_2$ concentration in the Martian atmosphere, along with other environmental variables, precludes simply venting the $CO_2$ after its removal from a spacesuit. Additionally a source of $O_2$ is also a requirement for the life support system, and again the weight of an $O_2$ source, such as an oxygen tank, must be considered. Vital $O_2$ is bound up in the $CO_2$ molecule, yet, none of the $CO_2$ removal technologies mentioned above capitalize on the use of the $CO_2$ as an $O_2$ source.

Hence, new methods must be developed or older/existing alternatives must be perfected to remove $CO_2$ from the space suit, without the need for venting, and to recover the oxygen from the $CO_2$ molecule. Indeed, if a system is able to capture and recycle all the oxygen from the exhaled $CO_2$, it may be possible to considerably reduce the need for additional $O_2$ sources (such as oxygen tanks) and hence gain significant weight savings.

SUMMARY OF THE INVENTION

The invention is a device for continuous conversion of $CO_2$ to $O_2$ thereby providing a breathable atmosphere for at least one individual in an environment where the individual must be isolated from the environment by a suit or other containment where a ventilation loop delivers exhaled air from the containment to the device and delivers inhalable air from the device to the containment. The device has at least one first stage that includes at least one inlet, at least one outlet, a plurality of sorption bed chambers where each chamber has at least one $CO_2$ sorption bed, a means to direct a gas flow to and from the chambers, and a means to actuate the means to direct. The device also has at least one second stage where each second stage includes at least one ceramic oxygen generator (COG) unit, at least one $CO_2$ intake, at least one $O_2$ exhaust, and a means, such as a metering valve, to control the $O_2$ exhaust from the second stage into the outlet of the first stage.

The means to direct the gas flow can be a first valve between the inlet and the chamber and a second valve between the chamber and the outlet. When the first valve is in an open position, the gas flow is directed to the chamber such that $CO_2$ is absorbed on the sorption bed and the second valve is positioned to direct the $CO_2$ depleted gas flow to the outlet. When the first valve is in a closed position, the gas flow is restricted from the chamber and the second valve is positioned to provide fluid communication between the chamber and the intake of the second stage such that $CO_2$ can be desorbed from the sorption bed into the second stage for conversion of the $CO_2$ to C and $O_2$ within the second stage.

The device can also include at least one $CO_2$ sensor in the outlet or at least one $CO_2$ sensor in each of the chambers. The sensors provide a signal to a means to actuate the valves or other means to direct the gas flow. When a level of $CO_2$ in the gas flow at the sensor exceeds a predetermined level of $CO_2$, the first and second valves of all chambers positioned to be in the gas flow of the ventilation loop are positioned to restrict the gas flow to the chambers that have exceeded the predetermined $CO_2$ level and place these chambers in communication with the second stage. The valves or other means of directing the gas flow of other chambers where the $CO_2$ has been desorbed from the sorption beds are simultaneously or subsequently placed into the position such that the exhalent gas at the intake is directed into these chambers to absorb $CO_2$ and released as a $CO_2$ depleted gas to the outlet and ultimately into the inhalant side of a ventilation loop when mixed with $O_2$ rich gas from the second stage and delivered to the containment. The sorption bed can be polyethyleneimine deposited on mesoporous molecular sieves. The chambers can include heat exchangers such that heat of absorption by sorption beds of chambers positioned between the inlet and outlet can be transferred to the sorption beds of chambers in communication with the second stage, thereby reducing any quantity of heat from an additional heating source that may be required to cause $CO_2$ desorption from sorption beds to the COGs of the second stage during use of the device.

The second stage of the device preferably has a catalytic carbon deposition layer (CCDL) on a cathode of the COG. This CCDL can be metal containing particles on a support, where the metal containing particles can be, for example, Fe, Ni, Co, alloys thereof, or oxides thereof and the support can be a metal wire mesh or a $SiO_2$ fiber cloth. The metal containing particles can be nanoparticle of about 10 to about 50 nm in size. The COG unit can employ a graded bilayer electrolyte comprising a layer of erbia-stabilized bismuth oxide (ESB) and a layer of samaria- or gadolinia doped ceria (SDC or GDC) between a cathode and an anode. The cathode can be a Pt-ceria cermet or a Cu-ceria cermet and the anode can be a silver-ESB cermet. The second stage can include CO sensors to provide a signal to an alarm that a predetermined level of CO has be exceeded in the second stage. The high level of CO can indicate saturated CCDLs or other factors that reduce the efficiency of the COGs. The CCDLs can be replaced when saturated.

The invention is also directed to a method of providing a breathable gas for life support, with the steps of: absorbing $CO_2$ from an exhaled gas flow in at least one chamber of the first stage of the device described above; directing the $CO_2$ depleted gas to an inhalable gas flow, converting the $CO_2$ desorbed from chambers restricted from the exhaled gas flow and in communication with a second stage of the device described above, to C and $O_2$; and directing the $O_2$ rich gas from the second stage to the inhalable gas flow.

BRIEF DESCRIPTION OF THE DRAWINGS

There are shown in the drawings, embodiments, which are presently preferred, it being understood, however, that the invention is not limited to the precise arrangements and instrumentalities shown.

FIG. 5 shows tubular (a) and planar (b) ceramic oxygen generators with removable catalytic carbon deposition layers (CCDL).

DETAILED DESCRIPTION

The present invention is a device for $CO_2$ removal from and $O_2$ addition to a life support system, such as a spacesuit. $CO_2$ will be removed using a catalytic layer in series with a ceramic oxygen generator (COG) so that it is reduced to carbon and oxygen as in the chemical equation below:

$$CO_2 \rightarrow C + O_2$$

Figure 1:
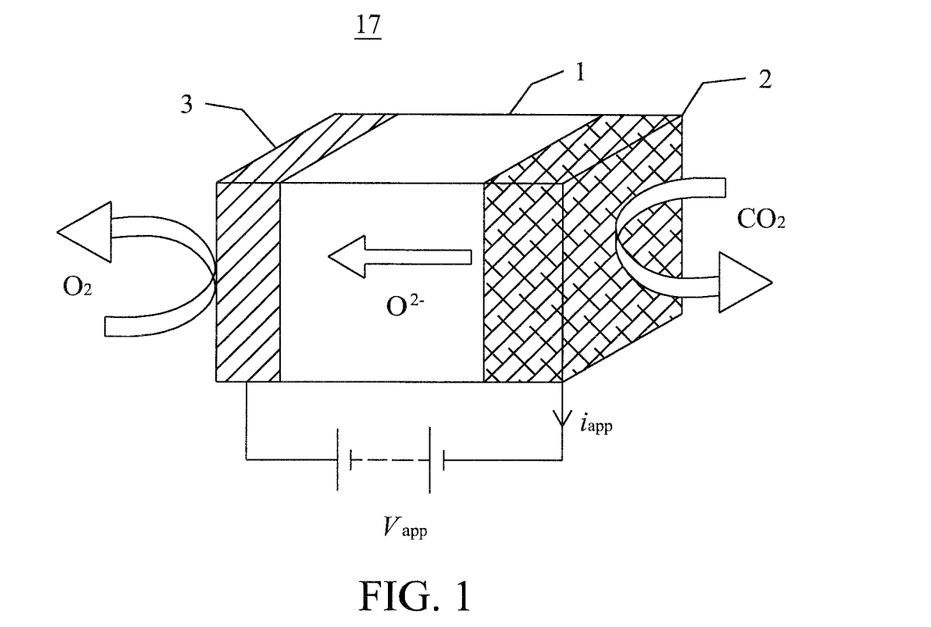
FIG. 1 shows a conceptual representation of a Ceramic Oxygen Generator (COG).

Carbon dioxide is electro-catalytically reduced at the cathode 2 of a COG 17, illustrated in FIG. 1, which transports the oxygen as $O_2^-$ ions from the cathode 2 leaving behind solid carbon. The driving force is an electric potential applied across a dense oxide ion-conducting electrolyte 1, as shown in FIG. 1. Under the influence of this potential, $CO_2$ adsorbed on the cathode 2, releases oxygen species, which are then incorporated into the lattice of the electrolyte 1 as oxide ions and transported to the anode 3, where they recombine to form $O_2$ molecules. The oxygen flux is given by Faraday's equation:

$$J_{O2} = i_{app} n^{-1} F^{-1} = W_{app} V_{app}^{-1} n^{-1} F^{-1}$$

where $J_{O2}$ is the molar flux of oxygen (mol/s), $i_{app}$ is the applied current (A), $W_{app}$ is the applied power, $V_{app}$ is the applied voltage, F is Faraday's constant and n is the number of electrons transferred in the ionization of an oxygen molecule.

Complete reduction of $CO_2$ to C and $O_2$, requires about 1.1 V/mole at 500° C. to 700° C. Given that $CO_2$ is produced metabolically at the rate of 25 mg/s (0.00057 mol/s), complete reduction of $CO_2$ (or equivalently removing all the oxygen released in the reaction) requires a power consumption of about 240 W if no operational losses occur. Such operational losses (due to Ohmic resistances and electrode overpotentials) must be included and, for accuracy, these values can be obtained from experiments. Furthermore, careful system design can allow for a reduction in the required oxygen removal rate and, hence, the applied power required.

Figure 2A:
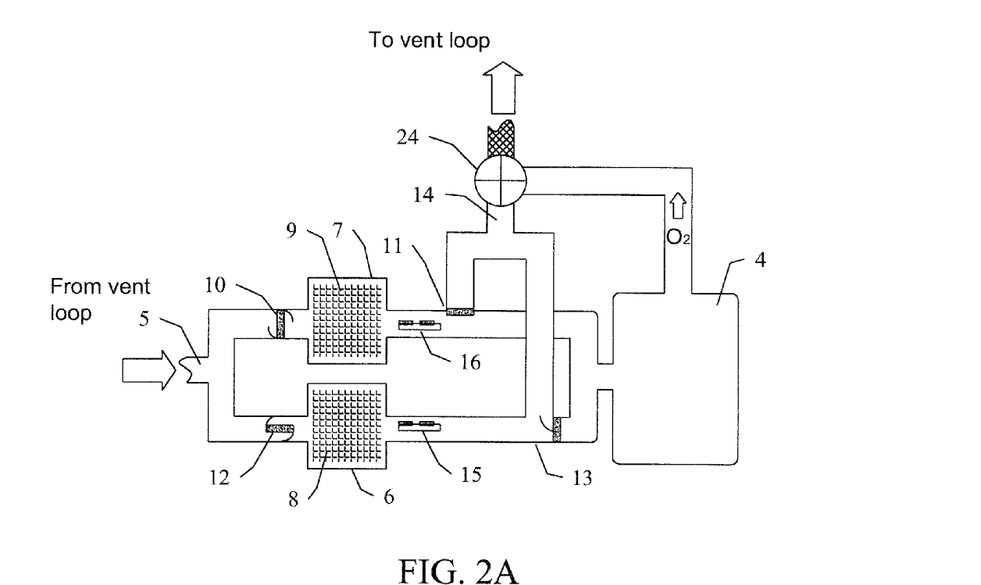
FIG. 2 is a schematic of the $CO_2$ removal system of the invention where the features of the $CO_2$ absorbance, of a first stage, are shown in (a) and the features of the COG, of a second stage, are shown in (b)
Figure 2B:
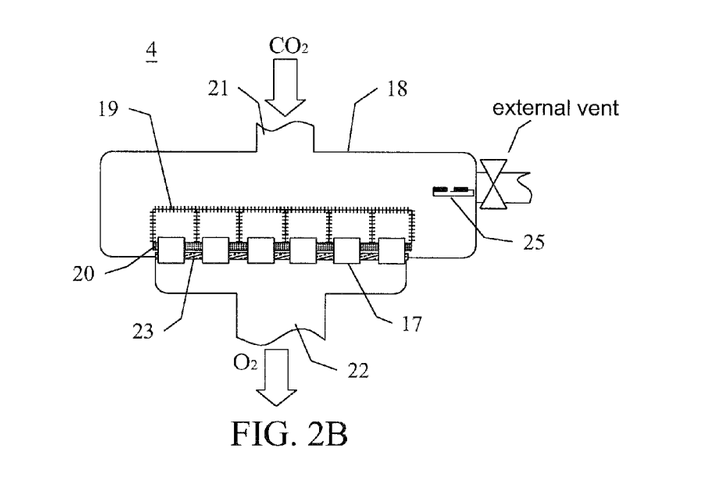

The $CO_2$ removal system of the present invention comprises two stages, as shown schematically in FIGS. 2a and 2b, respectively. Each stage can be, and, generally, the first stage is, comprised of a plurality of redundant combinations of functional components. The first stage has common features with a system for $NO_x$ removal, as disclosed in U.S. Pat. No. 5,456,807 to Wachsman et al., which is incorporated herein by reference. In this first stage $CO_2$ is concentrated before it is released to at least one COG 17 within a second stage 4. By concentrating the $CO_2$, the amount of oxygen pumped through the COG 17 is limited, primarily to that liberated by the reduction of the $CO_2$. In this manner, power consumption by the COG 17 is reduced by a considerable extent. FIG. 2a shows the removal and concentration of $CO_2$ in the first stage. The exhalant gas from a life support system is piped from the system's ventilation loop through an inlet 5 to one of a plurality of chambers, illustrated in FIG. 2a as two chambers 6 and 7, each containing a sorption bed 8 and 9 to remove $CO_2$. By closing valves 10 and 11 while opening valves 12 and 13, chamber 7 is excluded from the ventilation loop such that $CO_2$ is removed from the exhalant gas stream by the absorbent 8 in chamber 6 and the $CO_2$ depleted gas is reintroduced to the ventilation loop to the life support system through an outlet 14. The saturation level of the sorption bed in chamber 6 can be monitored by using at least one $CO_2$ sensor 15 to measure the $CO_2$ concentration in the effluent from the sorption bed. Once 15 senses a predetermined $CO_2$ concentration, the sorption bed 8 has achieved a desired degree of saturation and chamber 7 is automatically switched into communication with the ventilation loop by switching valves 10, 11, 12 and 13 such that $CO_2$ removal is handled by chamber 7, while simultaneously sealing chamber 6 from the ventilation loop and opening a connection from chamber 6 to second stage 4. The $CO_2$ is desorbed from the sorption bed 8 of chamber 6 into the second stage 4, where $CO_2$ is reduced to carbon and $O_2$. Once sensor 16 indicates that the desired level of $CO_2$ saturation has been achieved in sorption bed 9 of chamber 7, valves 10, 11, 12 and 13 are simultaneously switched such that the chamber 7 can vent to the second stage 4 while chamber 6 can absorb the $CO_2$ passing through the ventilation loop.

The $O_2$ recovered by at least one COG 17 is reintroduced to the ventilation loop as needed. The second stage 4, as shown in FIG. 2b comprises a chamber housing 18, at least one planar or tubular COG 17, a removable catalytic carbon deposition layer (CCDL) 19, and its support 20. Each COG 17 is oriented so that the cathode 2, as shown in FIG. 1, is directed to the intake 21 of stage 4 and the anode 3, as shown in FIG. 1, is directed to the exhaust 22 of the second stage 4. At least one gas-tight seal 23 isolates the intake 21 and the cathode 2 from the exhaust 22 and the anode 3 of the COG 17. A metering valve at the exhaust 22 allows $O_2$ produced at the anode 3 to be readily collected and reintroduced with the $CO_2$ depleted gas of the outlet 14, such that a breathable inhalant is provided to the ventilation loop. The amount of $O_2$ gas released from exhaust 22 into the ventilation loop is controlled via a metering valve 24. When the carbon buildup on the CCDL 19 surpasses an experimentally predetermined level, the CCDL 19 can be replaced with a carbon free CCDL. The carbon deposits may then be removed from the CCDL after which the CCDL can be reused if desired. As desired, the metering valve 24 can be controlled based on an input of an $O_2$ sensor (not shown) between the metering valve 24 and the outlet to the ventilation loop.

The CCDL 19 is designed such that its replacement is required only once in a predetermined period, for example replacement is required only once during an eight hour period. The second stage 4 preferably contains at least one carbon monoxide (CO) sensor 25 within the $CO_2$ rich side of the chamber housing 18. This CO sensor 25 should be sensitive to only a few parts per billion of CO in the atmosphere. Formation of CO can result from excessive carbon accumulation on the CCDL 19 and can be used to indicate a need for its replacement. When CO is sensed, the quantity of oxygen being recovered by the COG is necessarily less than optimal for the life support system.

An efficient $CO_2$ sorbent 8 and 9 in the first stage helps reduce weight and decreases the energy demand of the system, as heating is generally required to desorb the $CO_2$ to the second stage 4. The sorbent 8 and 9 is chosen to maximize the mass of $CO_2$ absorbed per unit mass of sorbent and permit regeneration with a low thermal energy requirement. Preferred sorbents are solids. Most preferably they are solids with a high selectivity for absorption of $CO_2$ selectively from the ventilation loop. The mode of $CO_2$ absorption can be physisorption or chemisorption. Physisorption can be carried out using zeolites, activated carbons and molecular sieves. Chemisorption systems that can be used include metal oxides, for example, CaO and/or MgO, and mixed metal oxides, for example, hydrotalcite compounds and/or perovskites. Chemisorption systems are generally more selective than physisorption systems. A polymeric adsorbent such as polyethyleneimine (PEI)-deposited on mesoporous molecular sieve MCM-41 can be used. The PEI/MCM-41 absorbent is a high-capacity and highly selective $CO_2$ sorbent that has been used to remove $CO_2$ from exhalants in the space shuttle. The adsorption/desorption temperatures are relatively low where desorption can occur at temperatures as low as about 75° C. Carbon nanotubes can be used as the sorbent. Furthermore, chemisorbents, for example, CaO, can be dispersed onto a high surface area support, for example, $Al_2O_3$, zeolites, activated carbon or carbon nanotubes. The absorption process is generally exothermic. For example, the enthalpy of reaction to absorb $CO_2$ on CaO is about −178 kJ/mol. In one embodiment of the invention, the first stage can be designed, such that the sorption beds and chambers behave as a heat exchanger, where the heat generated in one sorption chamber, for example, referring to FIG. 2a, absorbing chamber 6 can transfer heat to desorbing chamber 7.

Full $CO_2$ reduction results in carbon build up on the surface of cathode 2 of the COGs. If the amount of carbon deposited exceeds a critical level, carbon deposits can potentially: (i) block gas diffusion paths through the cathode to the triple-phase boundaries (TPBs)—i.e., lines where cathode 2, electrolyte 1 and gas phase coincide; and (ii) reduce the TPB length. As the gas diffusion paths become blocked, concentration overpotential increases until COG operation ceases due to starvation. As TPB length decreases, activation overpotential increases until COG operation ceases due to the absence of oxygen incorporation sites on the electrolyte surface. As illustrated in FIG. 2b, the CCDL 19 is placed between the intake 21 and the cathode 2 of the COG 17 to collect carbon before it reaches the cathode 2. The CCDL can include metals which are prone to "coking", i.e. carbon deposition, and include Ni, Fe and Co. However, coke formation is not a sufficient characteristic of an efficient CCDL. A CCDL must have the ability to adsorb and decompose $CO_2$. Most catalysts for $CO_2$ decomposition contain iron, and comprise oxygen-deficient Fe or Ni—Fe oxides. Although for the purpose of the invention the CCDL is referred to as catalysts, they are not catalysts in the truest sense, since the carbon is deposited onto the surface and the oxygen is incorporated into the lattice of the catalytic compounds. Consequently, the amount of $CO_2$ adsorbed and decomposed on the surface is proportional to the number of oxygen vacancies in the catalytic compounds, which, once fully oxidized, oxygen deficiency has to be reestablished before more $CO_2$ can react. For the present invention to generate $O_2$ efficiently oxygen must be continuously removed from the catalyst and the catalyst must have the ability to incorporate a large amount of carbon on the surface without catalyst deactivation. The COG of the invention reacts with the oxygen present in the system at the CCDL and effectively serves as an oxygen pump resulting in the continuous removal of the oxygen from the CCDL. The amount of carbon deposited on the catalysts can range from a few grams per gram of catalyst up to 380 g/g catalyst. An important catalyst property for forming carbon is the particle size of the active metal. Particle sizes of Ni, Fe and Co in the range of about 10 to 60 nm are desirable. The CCDL can be removed from the system when its catalytic activity decreases below a critical value due to excessive carbon deposition on the cathode. After the CCDL is removed from the second stage, the CCDL can be regenerated.

In one embodiment, Ni wire meshes and $SiO_2$ fiber cloths is used as structural supports for the catalyst of the CCDL. Ni wire mesh is commercially available in a range of different wire sizes and various mesh counts and the high temperature $SiO_2$ material is also available with different yarn sizes and thicknesses. Perhaps the main advantage with the $SiO_2$ material is the weight, which ranges from 3.6 to 40 oz/yd$^2$ dependent on the thickness and the weave construction. The particular dimensions of the Ni wire mesh depend on whether it is used as the actual support for the active metal, or if it is used to contain the catalyst. Small diameter wires permit a higher surface area of the nickel per mass of metal than do larger diameter wires. The openings in the wire mesh form an open structure that can allow carbon to grow. The CCDL catalysts can be prepared by dipping a Ni wire mesh or a $SiO_2$ fiber cloth in a dispersion of Ni or Fe nanoparticles. Although Fe and Ni nanoparticles are commercially available in nanoparticle sizes of 10 to 50 nm, in one embodiment of the invention oxides of these metals are used to avoid the flammability of the metal nanoparticles. $Fe_2O_3$, NiO, $NiFe_2O_4$ oxides or iron-based carbon nanotube catalyst can be used, and are commercially available. The nanoparticles can be dispersed in a solvent comprising either deionized water or alcohol and placed in an ultrasonic bath to break up some of the agglomerates before the Ni wire mesh or $SiO_2$ fiber cloth is dipped into the solution. Alternatively, the solvent can be sprayed onto the Ni wire mesh or $SiO_2$ fiber cloth. The Ni mesh and $SiO_2$ cloth can be drip dried before placed in a 110° C. oven. Before use in the second stage of the system, the CCDL catalysts are heated in air or nitrogen at the reaction temperature, or slightly above, to obtain a stable catalyst.

Figure 3:
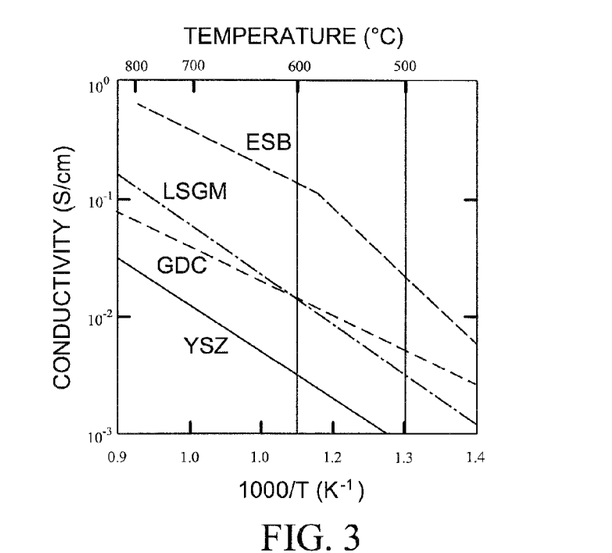
FIG. 3 is plot of the conductivities of different solid oxide electrolytes vs. temperature.

Current COG technology uses yttria-stabilized zirconia (YSZ) electrolytes, and is operated in the range of 700 to 1000° C. to avoid unacceptably high Ohmic losses. These high temperatures demand heavy materials for insulation and require significant energy input to achieve the operating temperature. For the present invention, it is critical to reduce the thermal gradient between the COG $O_2$ output and the ventilation loop gas temperature to achieve the goal of oxygen recovery and recycling and to control the temperature to which an individual using the system is exposed. Therefore, it is preferable to use a COG that has a reasonable power at low temperatures. Having a lower operating temperature provides the benefits of: (i) reduced thermal stresses (e.g., from thermal expansion mismatches); (ii) lowered radiative losses; and (iii) negligible electrode sintering. At lower temperatures, the oxide ion conductivity of YSZ is too low for viable operation in a COG, as can be seen in FIG. 3. As shown in FIG. 3, erbia-stabilized bismuth oxide (ESB) and an acceptor-doped ceria, gadolinia-doped ceria (GDC), have the highest conductivity for the targeted temperature range of about 500° C. However, in reducing conditions, such as high $CO_2$ reduction potential or low oxygen partial pressure, acceptor-doped ceria becomes a mixed conductor with a reduced efficiency, and bismuth oxide decomposes.

Figure 4:
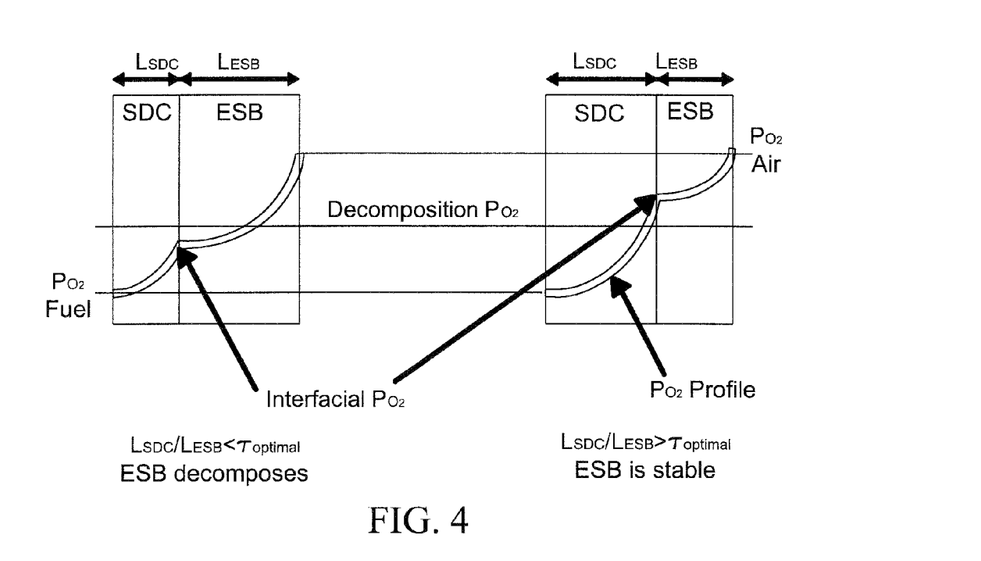
FIG. 4 shows a SDC-ESB bilayered electrolyte illustrating how the relative thickness can be varied to control the interfacial oxygen partial pressure($P_{O2}$) to avoid ESB decomposition.

In one embodiment of the invention, a functionally graded bilayer electrolyte, comprised of a layer of cubic-stabilized bismuth oxide, for example erbia-stabilized bismuth oxide (ESB), on the oxidizing side and a layer of acceptor-doped ceria, for example samaria- or gadolinia doped ceria (SDC or GDC), on the reducing side, is used. As illustrated in FIG. 4, this bilayer can employ constituent layers that have a thickness ratio where the ceria layer protects the bismuth oxide layer from decomposing by shielding it from very low oxygen partial pressures. Concomitantly, the ESB layer blocks electronic flux through the electrolyte and thereby neutralizes the efficiency decreasing electronic leakage of the ceria layer. Furthermore, small dopant concentrations of SDC in ESB or ESB in SDC have conductivities comparable to the host lattice and these solid solutions that can form at the SDC-ESB interface are not detrimental to the performance of the bilayer.

Figures 5A, 5B:
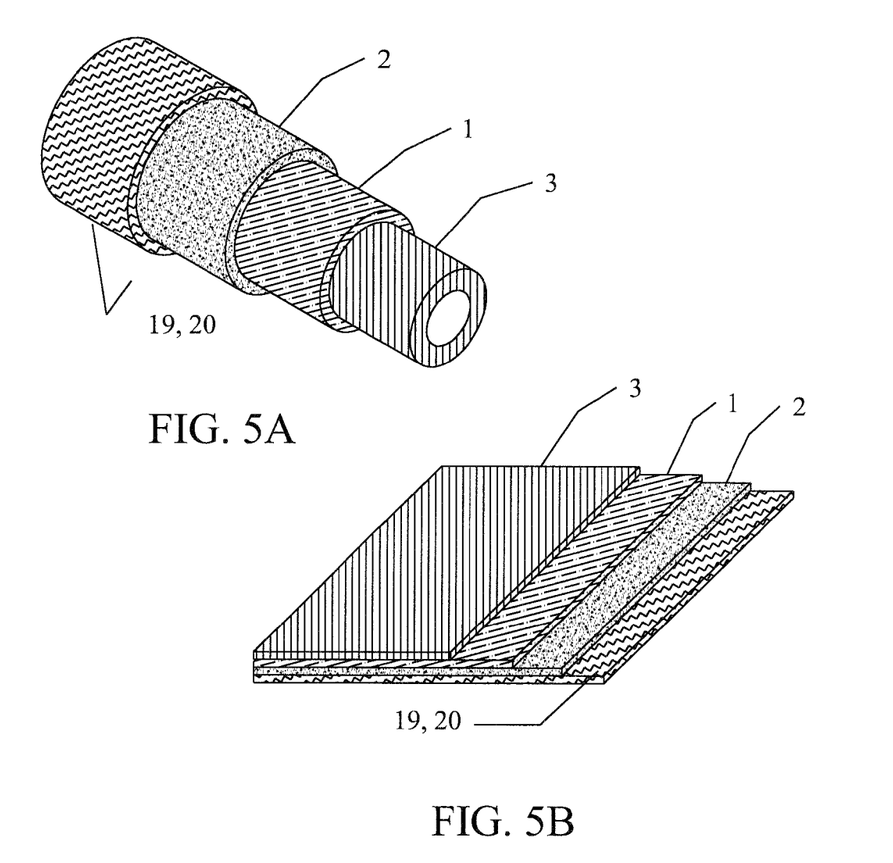

Both tubular and planar designs for the COG, as shown in FIGS. 5a and 5b, can be used. In general, tubular designs permit simplified sealing, which has generally been more reliable than seals in planar configurations. However, planar designs are generally simpler to fabricate.

The thickness of the bilayer electrolyte 1 is critical for minimizing Ohmic losses. An electrolyte thickness less than about 8 μm on a porous Ni-ceria substrate generally compromises its density, resulting in pinhole formation through the electrolyte 1. Consequently, a bilayer electrolyte prepared via this technique has a minimum thickness of about 16 μm, or greater for thickness ratios other than 1:1. Increased electrolyte thickness leads to greater power consumption.

Because ceria sinters at temperatures in excess of 1500° C. while bismuth oxide sinters at about 890° C., the ceria layer is applied and sintered before applying the bismuth oxide film. After sintering of the ceria layer, application of the bismuth oxide layer by dip-coating (or spray-coating) becomes more difficult. To get a dense film, the thickness of the bismuth oxide layer is applied at thicknesses greater than 8 μm. For planar designs, as shown in. FIG. 5b, other thin film techniques can be used to form one or both constituent layers. Pulsed Laser Deposition (PLD) is a thin film technique that can deposit dense, stoichiometric and homogenous oxide films.

Prior art bilayer COGs use platinum (Pt) cathodes and Ag-ESB anodes. To increase the performance of bilayer COGs, in one embodiment of the invention, porous Pt-ceria or Cu-ceria cermets are used as the cathode 2. Cermets increase the concentration of triple phase boundaries (TPBs)—where gas, ionic/ceramic and electronic/metallic phases meet. Moreover, since the TPBs are no longer confined to the electrolyte surface, the average distance traveled by the gas molecules to the reaction sites (i.e., the mean free path) is reduced significantly. This results in a reduction of the cathode 2 overpotential so that less power is used for $CO_2$ reduction/oxygen generation. In one embodiment of the invention, porous silver-ESB (erbia-stabilized bismuth oxide) cermets can be used as the anode 3. In another embodiment of the invention, bismuth ruthenate-ESB composites can be used as the anode 3.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A device for continuous conversion of $CO_2$ to $O_2$ providing a breathable atmosphere, comprising:
    at least one first stage comprising at least one inlet, at least one outlet, a plurality of sorption bed chambers, each chamber comprising at least one $CO_2$ sorption bed, a means to direct a gas flow to and from said chambers, and a means to actuate said means to direct; and
    at least one second stage comprising at least one ceramic oxygen generator (COG) unit comprising a catalytic carbon deposition layer (CCDL) on a cathode of said COG, at least one $CO_2$ intake, at least one $O_2$ exhaust, and a means to control said exhaust from said second stage into said outlet of said first stage.

2. The device of claim 1, wherein said means to direct said gas flow comprises a first valve between said inlet and said bed and a second valve between said bed and said outlet, wherein when said first valve is in an open position said gas flow is directed to said chamber and said second valve is positioned to direct said gas flow to said outlet, and wherein when said first valve is in a closed position said gas flow is restricted from said chamber and said second valve is positioned to provide communication between said chamber and said intake of said second stage.

3. The device of claim 1, wherein said means to control said exhaust comprises a metering valve.

4. The device of claim 1, further comprising at least one $CO_2$ sensor in said outlet or at least one $CO_2$ sensor in each of said chambers, wherein said sensor provides a signal to each of said means to actuate when a level of $CO_2$ in said gas flow exceeds a predetermined level of $CO_2$ wherein said first and second valves of said plurality of said chambers are positioned to direct said gas flow to at least one, but not all, of said chambers and restrict gas flow to all other of said chambers.

5. The device of claim 1, further comprising at least one CO sensor in said second stage wherein said sensor provides a signal to an alarm when a predetermined level of CO is exceeded.

6. The device of claim 1, wherein said CCDL further comprises metal containing particles on a support.

7. The device of claim 1, wherein said CCDL further comprises metal containing particles on a support, wherein said metal comprises Fe, Ni, Co, alloys thereof, or oxides thereof.

8. The device of claim 1, wherein said CCDL further comprises metal containing particles on a support, wherein said metal comprises Fe, Ni, Co, alloys thereof, or oxides thereof, and wherein said particles are from about 10 to about 50 nm in size.

9. The device of claim 1, wherein said CCDL further comprises metal containing particles on a support, wherein said support is a Ni comprising wire mesh or a $SiO_2$ comprising fiber cloth.

10. The device of claim 1, wherein said bed comprises polyethyleneimine deposited on mesoporous molecular sieves.

11. The device of claim 1, further comprising one or more heat exchangers.

12. A method of providing a breathable gas for life support, comprising the steps of:
adsorbing $CO_2$ from an exhaled gas flow in at least one first stage of a device, wherein said first stage comprises at least one inlet, at least one outlet, a plurality of sorption bed chambers, each chamber comprising at least one $CO_2$ sorption bed where said gas is depleted of $CO_2$, a means to direct a gas flow to and from said chambers or restrict flow from said chamber and place said chamber into communication with at least one second stage, and a means to actuate said means to direct;
directing said $CO_2$ depleted gas from said chamber to an inhalable gas flow;
converting said $CO_2$ to C and $O_2$ in said second stages of said device, wherein said second stage comprises at least one ceramic oxygen generator (COG) units comprising a catalytic carbon deposition layer (CCDL) on a cathode of said COG, at least one $CO_2$ intake, at least one $O_2$ exhaust, and a means to control said exhaust from said second stage; and
directing said $O_2$ from said exhaust to said inhalable gas flow.

13. The method of claim 12, wherein said means to direct said gas flow comprises a first valve between said inlet and said bed and a second valve between said bed and said outlet, wherein when said first valve is in an open position to direct said gas flow to said bed and said second valve is positioned to direct said gas flow to said outlet, and wherein when said first valve is in a closed position, restricts said gas flow to said bed and said second valve is positioned to provide communication between said chamber and said intake of said second stage.

14. The method of claim 12, wherein said means to control said exhaust comprises a metering valve.

15. The method of claim 12, wherein said first stage further comprises at least one $CO_2$ sensor in said outlet or at least one $CO_2$ sensor in each of said chambers, wherein said sensor provides a signal to each of said means to actuate when the level of $CO_2$ in said gas flow exceeds a predetermined level of $CO_2$ wherein said first and second valves of said plurality of said chambers are positioned to direct said gas flow to at least one, but not all, of said chambers and restrict gas flow to all other of said chambers.

16. The method of claim 12, wherein said second stage further comprises at least one CO sensor in said second stage wherein said sensor provides a signal to an alarm when a predetermined level of CO is exceeded.

17. The method of claim 12, wherein said CCDL further comprises metal containing particles on a support.

18. The method of claim 12, wherein said CCDL further comprises metal containing particles on a support, and wherein said metal particles comprise Fe, Ni, Co, alloys thereof, or oxides thereof.

19. The method of claim 12, wherein said CCDL further comprises metal containing particles on a support, and wherein said metal particles comprise Fe, Ni, Co, alloys thereof, or oxides thereof, and wherein said particles are from about 10 to about 50 nm in size.

20. The method of claim 12, wherein said CCDL further comprises metal containing particles on a support, and wherein said support is a Ni comprising wire mesh or a $SiO_2$ comprising fiber cloth.

21. The method of claim 12, wherein said bed comprises polyethyleneimine deposited on mesoporous molecular sieves.

22. A device for continuous conversion of $CO_2$ to $O_2$ providing a breathable atmosphere, comprising:
at least one first stage comprising at least one inlet, at least one outlet, a plurality of sorption bed chambers, each chamber comprising at least one $CO_2$ sorption bed, a means to direct a gas flow to and from said chambers, and a means to actuate said means to direct; and
at least one second stage comprising at least one ceramic oxygen generator (COG) unit comprising a graded bilayer electrolyte comprising a layer of cubic-stabilized bismuth oxide and a layer of acceptor-doped ceria between a cathode and an anode, at least one $CO_2$ intake, at least one $O_2$ exhaust, and a means to control said exhaust from said second stage into said outlet of said first stage.

23. The device of claim 22, wherein said means to direct said gas flow comprises a first valve between said inlet and said bed and a second valve between said bed and said outlet, wherein when said first valve is in an open position said gas flow is directed to said chamber and said second valve is positioned to direct said gas flow to said outlet, and wherein when said first valve is in a closed position said gas flow is restricted from said chamber and said second valve is positioned to provide communication between said chamber and said intake of said second stage.

24. The device of claim 22, wherein said means to control said exhaust comprises a metering valve.

25. The device of claim 22, further comprising at least one $CO_2$ sensor in said outlet or at least one $CO_2$ sensor in each of said chambers, wherein said sensor provides a signal to each of said means to actuate when a level of $CO_2$ in said gas flow exceeds a predetermined level of $CO_2$ wherein said first and second valves of said plurality of said chambers are positioned to direct said gas flow to at least one, but not all, of said chambers and restrict gas flow to all other of said chambers.

26. The device of claim 22, further comprising at least one CO sensor in said second stage wherein said sensor provides a signal to an alarm when a predetermined level of CO is exceeded.

27. The device of claim 22, wherein said second stage further comprises a catalytic carbon deposition layer (CCDL) on a cathode of said COG.

28. The device of claim 22, wherein said second stage further comprises a CCDL on a cathode of said COG, and wherein said CCDL comprises metal containing particles on a support.

29. The device of claim 22, wherein second stage further comprises a CCDL on a cathode of said COG, wherein said CCDL comprises metal containing particles on a support, and wherein said metal particles comprise Fe, Ni, Co, alloys thereof, or oxides thereof.

30. The device of claim 22, wherein said second stage further comprises a CCDL on a cathode of said COG, wherein said CCDL further comprises metal containing particles on a support, and wherein said metal particles comprise Fe, Ni, Co, alloys thereof, or oxides thereof, and wherein said particles are from about 10 to about 50 nm in size.

31. The device of claim 22, wherein said second stage further comprises a CCDL on a cathode of said COG, wherein said CCDL further comprises metal containing particles on a support, and wherein said support is a Ni comprising wire mesh or a $SiO_2$ comprising fiber cloth.

32. The device of claim 22, wherein said cubic-stabilized bismuth oxide comprises an erbia-stabilized bismuth oxide (ESB).

33. The device of claim 22, wherein said acceptor-doped ceria comprises a samaria- or a gadolinia-doped ceria (SDC or GDC).

34. The device of claim 22, wherein said cathode comprises a Pt-ceria cermet or a Pd-ceria cermet.

35. The device of claim 22, wherein said anode comprises a silver-ESB cermet.

36. The device of claim 22, wherein said bed comprises polyethyleneimine deposited on mesoporous molecular sieves.

37. The device of claim 22, further comprising one or more heat exchangers.

38. A method of providing a breathable gas for life support, comprising the steps of:
adsorbing $CO_2$ from an exhaled gas flow in at least one first stage of a device, wherein said first stage comprises at least one inlet, at least one outlet, a plurality of sorption bed chambers, each chamber comprising at least one $CO_2$ sorption bed where said gas is depleted of $CO_2$, a means to direct a gas flow to and from said chamber or restrict flow from said chamber and place said chamber into communication with at least one second stage, and a means to actuate said means to direct;
directing said $CO_2$ depleted gas from said chamber to an inhalable gas flow;
converting said $CO_2$ to C and $O_2$ in said second stages of said device, wherein said second stage comprises at least one ceramic oxygen generator (COG) unit comprising a graded bilayer electrolyte comprising a layer of cubic-stabilized bismuth oxide and a layer of acceptor-doped ceria between a cathode and an anode, at least one $CO_2$ intake, at least one $O_2$ exhaust, and a means to control said exhaust from said second stage; and
directing said $O_2$ from said exhaust to said inhalable gas flow.

39. The method of claim 38, wherein said means to direct said gas flow comprises a first valve between said inlet and said bed and a second valve between said bed and said outlet, wherein when said first valve is in an open position to direct said gas flow to said bed and said second valve is positioned to direct said gas flow to said outlet, and wherein when said first valve is in a closed position, restricts said gas flow to said bed and said second valve is positioned to provide communication between said chamber and said intake of said second stage.

40. The method of claim 38, wherein said means to control said exhaust comprises a metering valve.

41. The method of claim 38, wherein said first stage further comprises at least one $CO_2$ sensor in said outlet or at least one $CO_2$ sensor in each of said chambers, wherein said sensor provides a signal to each of said means to actuate when the level of $CO_2$ in said gas flow exceeds a predetermined level of $CO_2$, and wherein said first and second valves of said plurality of said chambers are positioned to direct said gas flow to at least one, but not all, of said chambers and restrict gas flow to all other of said chambers.

42. The method of claim 38, wherein said second stage further comprises at least one CO sensor in said second stage and wherein said sensor provides a signal to an alarm when a predetermined level of CO is exceeded.

43. The method of claim 38, wherein said second stage further comprises a catalytic carbon deposition layer (CCDL) on a cathode of said COG.

44. The method of claim 38, wherein said second stage further comprises a CCDL on a cathode of said COG, and wherein said CCDL further comprises metal containing particles on a support.

45. The method of claim 38, wherein second stage further comprises a CCDL on a cathode of said COG, and wherein said CCDL further comprises metal containing particles on a support, said metal particles comprising Fe, Ni, Co, alloys thereof, or oxides thereof.

46. The method of claim 38, wherein wherein second stage further comprises a CCDL on a cathode of said COG, wherein said CCDL further comprises metal containing particles on a support, said metal particles comprising Fe, Ni, Co, alloys thereof, or oxides thereof, and wherein said particles are from about 10 to about 50 nm in size.

47. The method of claim 38, wherein said second stage further comprises a CCDL on a cathode of said COG, wherein said CCDL further comprises metal containing particles on a support, and wherein said support is a Ni comprising wire mesh or a $SiO_2$ comprising fiber cloth.

48. The method of claim 38, wherein said cubic-stabilized bismuth oxide comprises an erbia-stabilized bismuth oxide (ESB).

49. The method of claim 38, wherein said acceptor-doped ceria comprises a samaria- or a gadolinia-doped ceria (SDC or GDC).

50. The method of claim 38, wherein said cathode comprises a Pt-ceria cermet or a Pd-ceria cermet.

51. The method of claim 38, wherein said anode comprises a silver-ESB cermet.

52. The method of claim 38, wherein said bed comprises polyethyleneimine deposited on mesoporous molecular sieves.

* * * * *